(12) United States Patent
Matsuo et al.

(10) Patent No.: US 11,742,488 B2
(45) Date of Patent: Aug. 29, 2023

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yusaku Matsuo, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 387 days.

(21) Appl. No.: 16/757,765

(22) PCT Filed: Oct. 19, 2018

(86) PCT No.: PCT/JP2018/039057
§ 371 (c)(1),
(2) Date: Apr. 21, 2020

(87) PCT Pub. No.: WO2019/087827
PCT Pub. Date: May 9, 2019

(65) Prior Publication Data
US 2021/0111408 A1     Apr. 15, 2021

(30) Foreign Application Priority Data
Oct. 30, 2017    (JP) ................................ 2017-209351

(51) Int. Cl.
| | | |
|---|---|---|
| *H01M 4/00* | (2006.01) | |
| *H01M 4/62* | (2006.01) | |
| *C08L 33/06* | (2006.01) | |
| *C08L 51/00* | (2006.01) | |
| *H01M 10/0525* | (2010.01) | |
| *H01M 4/02* | (2006.01) | |

(52) U.S. Cl.
CPC .......... *H01M 4/622* (2013.01); *C08L 33/064* (2013.01); *C08L 51/006* (2013.01); *H01M 10/0525* (2013.01); *C08L 2203/20* (2013.01); *H01M 2004/021* (2013.01)

(58) Field of Classification Search
CPC ............ H01M 4/622; H01M 10/0525; H01M 2004/021; H01M 4/587; H01M 2004/027; H01M 2300/0025; H01M 4/0404; H01M 4/133; H01M 4/13; H01M 10/052; C08L 33/064; C08L 51/006; C08L 2203/20; Y02E 60/10

See application file for complete search history.

(56) References Cited

U.S. PATENT DOCUMENTS

| | | | |
|---|---|---|---|
| 7,150,937 B2 | 12/2006 | Suzuki et al. | |
| 10,566,627 B2 | 2/2020 | Yamamoto | |
| 2010/0015328 A1* | 1/2010 | Hirokawa ............... | H01G 11/38 427/80 |
| 2016/0036055 A1* | 2/2016 | Yamamoto .......... | H01M 4/1393 252/511 |
| 2017/0256800 A1 | 9/2017 | Kaneda et al. | |
| 2017/0309889 A1 | 10/2017 | Masuda et al. | |
| 2019/0044147 A1 | 2/2019 | Yamamoto | |
| 2019/0044148 A1 | 2/2019 | Yamamoto | |
| 2020/0176778 A1* | 6/2020 | Asai ..................... | H01M 10/058 |

FOREIGN PATENT DOCUMENTS

| | | | |
|---|---|---|---|
| CN | 1341976 A | 3/2002 | |
| CN | 105190967 A | 12/2015 | |
| EP | 3358659 A1 | 8/2018 | |
| EP | 3419089 A1 | 12/2018 | |
| JP | 2006260782 A | 9/2006 | |
| WO | WO-2014148064 A1 * | 9/2014 | .......... H01M 4/0404 |
| WO | 2016080144 A1 | 5/2016 | |
| WO | 2017056404 A1 | 4/2017 | |
| WO | 2017141791 A1 | 8/2017 | |

OTHER PUBLICATIONS

Jul. 5, 2021, the Extended European Search Report issued by the European Patent Office in the corresponding European Patent Application No. 18871894.4.

May 5, 2020, International Preliminary Report on Patentability issued in the International Patent Application No. PCT/JP2018/039057.

* cited by examiner

*Primary Examiner* — Nicholas P D'Aniello
(74) *Attorney, Agent, or Firm* — Kenja IP Law PC

(57) ABSTRACT

A binder composition for a non-aqueous secondary battery electrode contains a particulate polymer A and a particulate polymer B. The particulate polymer A is a block copolymer including an aromatic vinyl monomer unit and an aliphatic conjugated diene monomer unit having a carbon number of 4 or more. The particulate polymer B is a random copolymer including a (meth)acrylic acid ester monomer unit in a proportion of not less than 20.0 mass % and not more than 80.0 mass %.

8 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, in recent years, studies have been made to improve electrodes and other battery components with the aim of achieving even higher non-aqueous secondary battery performance.

An electrode for a secondary battery, such as a lithium ion secondary battery, generally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium (solvent), and drying the applied slurry composition.

In recent years, attempts have been made to improve binder compositions used in formation of electrodes in order to achieve further improvement of secondary battery performance (for example, refer to Patent Literature (PTL) 1 and 2).

PTL 1 discloses a lithium ion secondary battery including a negative electrode formed using a slurry composition for an electrode that contains only styrene-ethylene-butylene-styrene block copolymerization polymer particles as a binder component.

PTL 2 discloses a binder composition for a non-aqueous secondary battery electrode in which a particulate polymer A and a particulate polymer B having different particle diameters to one another are compounded in a specific ratio. More specifically, the particulate polymer A can include an aliphatic conjugated diene monomer unit in a proportion of not less than 50 mass % and not more than 90 mass % and can include an aromatic vinyl monomer unit in a proportion of not less than 10 mass % and not more than 50 mass %. Moreover, the particulate polymer B can include an aliphatic conjugated diene monomer unit in a proportion of not less than 30 mass % and not more than 60 mass %.

CITATION LIST

Patent Literature

PTL 1: WO 2016/080144 A1
PTL 2: WO 2017/056404 A1

SUMMARY

Technical Problem

However, there has been demand for further improvement of secondary battery performance in recent years, and the conventional slurry composition and binder composition described above leave room for improvement in terms of further improving battery characteristics such as low-temperature output characteristics and cycle characteristics of an obtained non-aqueous secondary battery.

Accordingly, one objective of the present disclosure is to provide a binder composition for a non-aqueous secondary battery electrode and a slurry composition for a non-aqueous secondary battery electrode with which it is possible to form an electrode for a non-aqueous secondary battery that can cause a non-aqueous secondary battery to display excellent low-temperature output characteristics and cycle characteristics.

Another objective of the present disclosure is to provide an electrode for a non-aqueous secondary battery that can cause a non-aqueous secondary battery to display excellent low-temperature output characteristics and cycle characteristics.

Yet another objective of the present disclosure is to provide a non-aqueous secondary battery having excellent battery characteristics such as low-temperature output characteristics and cycle characteristics.

Solution to Problem

The inventors conducted diligent investigation with the aim of solving the problem set forth above. The inventors discovered that by using a binder composition that contains both a particulate polymer that is a block copolymer including an aromatic vinyl monomer unit and an aliphatic conjugated diene monomer unit having a carbon number of 4 or more and a particulate polymer that is a random copolymer including a (meth)acrylic acid ester monomer unit in a proportion of not less than 20 mass % and not more than 80 mass %, it is possible to form an electrode for a non-aqueous secondary battery that can cause a non-aqueous secondary battery to display excellent low-temperature output characteristics and cycle characteristics, and, in this manner, the inventors completed the present disclosure.

Specifically, the present disclosure aims to advantageously solve the problem set forth above by disclosing a binder composition for a non-aqueous secondary battery electrode comprising a particulate polymer A and a particulate polymer B, wherein the particulate polymer A is a block copolymer including an aromatic vinyl monomer unit and an aliphatic conjugated diene monomer unit having a carbon number of 4 or more, and the particulate polymer B is a random copolymer including a (meth)acrylic acid ester monomer unit in a proportion of not less than 20.0 mass % and not more than 80.0 mass %. When an electrode is formed using a binder composition containing a particulate polymer A that is a block copolymer including an aromatic vinyl monomer unit and an aliphatic conjugated diene monomer unit and a particulate polymer B that is a random copolymer including a (meth)acrylic acid ester monomer unit in the specific proportion set forth above in this manner, a non-aqueous secondary battery that includes the electrode can be caused to display excellent low-temperature output characteristics and cycle characteristics.

Note that a "monomer unit" of a polymer referred to in the present disclosure is a "repeating unit derived from the monomer that is included in a polymer obtained using the monomer". The proportion in which a monomer unit is included in a polymer can be measured by $^1$H-NMR. Also note that in the present disclosure, "(meth)acryl" is used to indicate "acryl" or "methacryl".

In the presently disclosed binder composition for a non-aqueous secondary battery electrode, the particulate polymer A preferably includes a graft portion. When the particulate polymer A includes a graft portion, aggregation of compounded components such as an electrode active material can be inhibited during application of a slurry composition for a non-aqueous secondary battery electrode that is produced using the binder composition.

In the presently disclosed binder composition for a non-aqueous secondary battery electrode, the graft portion of the particulate polymer A preferably includes an acidic group-containing monomer unit in a proportion of not less than 0.1 mass % and not more than 30.0 mass % when the particulate polymer A is taken to be 100 mass % overall. When the particulate polymer A includes a graft portion including an acidic group-containing monomer unit and when the proportion in which the acidic group-containing monomer unit is included in the graft portion relative to the overall particulate polymer A is within the range set forth above, it is possible to increase stability and improve coating density of a slurry composition for a non-aqueous secondary battery electrode produced using the binder composition, and also to better inhibit aggregation of compounded components such as an electrode active material during application of the slurry composition.

Note that the proportion constituted in the overall particulate polymer A by the acidic group-containing monomer unit that is a constituent of the graft portion can be measured by a method described in the EXAMPLES section of the present specification.

In the presently disclosed binder composition for a non-aqueous secondary battery electrode, the particulate polymer A preferably includes the aromatic vinyl monomer unit in a proportion of not less than 10.0 mass % and not more than 30.0 mass %. When the particulate polymer A includes the aromatic vinyl monomer unit in the specific proportion set forth above, it is possible to increase stability of a slurry composition for a non-aqueous secondary battery electrode produced using the binder composition, and also to further improve low-temperature output characteristics and cycle characteristics of a secondary battery including an electrode formed using the slurry composition for a non-aqueous secondary battery electrode.

In the presently disclosed binder composition for a non-aqueous secondary battery electrode, content of the particulate polymer A is preferably not less than 20.0 mass % and not more than 80.0 mass % when total content of the particulate polymer A and the particulate polymer B is taken to be 100 mass %. When the proportion constituted by the particulate polymer A among the total amount of the particulate polymers A and B is within the range set forth above, low-temperature output characteristics and cycle characteristics of an obtained secondary battery can be further improved.

In the presently disclosed binder composition for a non-aqueous secondary battery electrode, the particulate polymer B preferably includes a monomer unit selected from an aromatic vinyl monomer unit and a vinyl cyanide monomer unit in a proportion of not less than 10 mass % and not more than 70 mass %. When the particulate polymer B includes a monomer unit selected from an aromatic vinyl monomer unit and a vinyl cyanide monomer unit in a proportion within the range set forth above, cycle characteristics of an obtained secondary battery can be further improved.

In the presently disclosed binder composition for a non-aqueous secondary battery electrode, the particulate polymer B preferably further includes an acidic group-containing monomer unit in a proportion of not less than 1.0 mass % and not more than 15.0 mass %. When the particulate polymer B includes an acidic group-containing monomer unit in a proportion within the range set forth above, low-temperature output characteristics and cycle characteristics of an obtained secondary battery can be further improved.

The present disclosure also aims to advantageously solve the problem set forth above by disclosing a slurry composition for a non-aqueous secondary battery electrode comprising any one of the binder compositions for a non-aqueous secondary battery electrode set forth above. When an electrode is formed using a slurry composition that contains any one of the binder compositions set forth above in this manner, low-temperature output characteristics and cycle characteristics of a secondary battery including the electrode can be further improved.

The present disclosure also aims to advantageously solve the problem set forth above by disclosing an electrode for a non-aqueous secondary battery comprising an electrode mixed material layer formed using any one of the slurry compositions set forth above, wherein the electrode mixed material layer has a density of 1.70 g/cm$^3$ or more. Through use of any one of the slurry compositions set forth above, it is possible to form a high-density electrode that can enhance low-temperature output characteristics and cycle characteristics of a secondary battery. Note that the density of the electrode mixed material layer can be calculated using the mass of the electrode mixed material layer per unit area and the thickness of the electrode mixed material layer.

The present disclosure also aims to advantageously solve the problem set forth above by disclosing a non-aqueous secondary battery comprising the electrode for a non-aqueous secondary battery set forth above. A secondary battery that includes the electrode for a non-aqueous secondary battery set forth above has excellent low-temperature output characteristics and cycle characteristics.

Advantageous Effect

According to the present disclosure, it is possible to provide a binder composition for a non-aqueous secondary battery electrode and a slurry composition for a non-aqueous secondary battery electrode with which it is possible to form an electrode for a non-aqueous secondary battery that can cause a non-aqueous secondary battery to display excellent low-temperature output characteristics and cycle characteristics.

Moreover, according to the present disclosure, it is possible to provide an electrode for a non-aqueous secondary battery that can cause a non-aqueous secondary battery to display excellent low-temperature output characteristics and cycle characteristics.

Furthermore, according to the present disclosure, it is possible to provide a non-aqueous secondary battery having excellent battery characteristics such as low-temperature output characteristics and cycle characteristics.

DETAILED DESCRIPTION

The following provides a detailed description of embodiments of the present disclosure.

The presently disclosed binder composition for a non-aqueous secondary battery electrode is a composition for use in the production of a non-aqueous secondary battery and can be used to produce the presently disclosed slurry composition for a non-aqueous secondary battery electrode, for example. Moreover, the presently disclosed slurry composition for a non-aqueous secondary battery electrode can be used in formation of an electrode of a non-aqueous secondary battery and is suitable, in particular, for use in formation of a negative electrode of a non-aqueous secondary battery. Furthermore, the presently disclosed electrode for a non-aqueous secondary battery is formed from the presently disclosed slurry composition for a non-aqueous secondary battery electrode. Also, the presently disclosed non-aqueous secondary battery includes the presently disclosed electrode for a non-aqueous secondary battery.

(Binder Composition for Non-Aqueous Secondary Battery Electrode)

The presently disclosed binder composition contains a particulate polymer A and a particulate polymer B, and may optionally further contain other components that can be compounded in an electrode of a secondary battery. Moreover, the presently disclosed binder composition for a non-aqueous secondary battery electrode can further contain a solvent such as water. Features of the presently disclosed binder composition are that the particulate polymer A is a block copolymer including an aromatic vinyl monomer unit and an aliphatic conjugated diene monomer unit having a carbon number of 4 or more, and the particulate polymer B is a random copolymer including a (meth)acrylic acid ester monomer unit in a proportion of not less than 20 mass % and not more than 80 mass %.

The particulate polymer A is a block copolymer including an aromatic vinyl monomer unit and is a polymer that can favorably follow expansion and contraction of an electrode active material accompanying repeated charging and discharging. The particulate polymer B is a random copolymer including a (meth)acrylic acid ester monomer unit in a specific proportion and is a polymer that itself has high flexibility and that can also increase slurry composition stability. Consequently, a coating film formed on a substrate through application of a slurry composition that is produced using the binder composition containing both of these particulate polymers A and B has high dispersibility of solid content such as an electrode active material. Moreover, when this coating film is pressed to form a high-density electrode mixed material layer, it is presumed that good formation of a high-density electrode mixed material layer is possible without application of excessive pressure because an appropriate degree of flexibility can be displayed by the particulate polymer B. Consequently, a slurry composition produced using the binder composition containing both the particulate polymer A and the particulate polymer B can form an electrode that has low internal resistance and excellent resistance to deformation in accompaniment to repeated charging and discharging. Therefore, the presently disclosed binder composition enables formation of an electrode for a non-aqueous secondary battery that can cause a non-aqueous secondary battery to display excellent low-temperature output characteristics and cycle characteristics.

<Particulate Polymer A>

In an electrode produced by forming an electrode mixed material layer on a current collector using a slurry composition for a non-aqueous secondary battery electrode that is produced using the binder composition, the particulate polymer A holds components contained in the electrode mixed material layer to prevent these components detaching from the electrode mixed material layer (i.e., the particulate polymer A functions as a binder). Note that the particulate polymer A is in the form of water-insoluble particles formed by a specific block copolymer. The particulate polymer A includes at least the specific block copolymer and may include components other than the specific block copolymer such as components that are unavoidably mixed in at the production stage.

When particles are referred to as "water-insoluble" in the present disclosure, this means that when 0.5 g of the particles are dissolved in 100 g of water at a temperature of 25° C., insoluble content is 90 mass % or more.

<<Structure and Chemical Composition>>

The particulate polymer A is a block copolymer including an aromatic vinyl monomer unit and an aliphatic conjugated diene monomer unit having a carbon number of 4 or more. More specifically, the particulate polymer A is a block copolymer including a block region formed by an aromatic vinyl monomer unit (hereinafter, also referred to simply as an "aromatic vinyl block region") and a block region formed by an aliphatic conjugated diene monomer unit having a carbon number of 4 or more (hereinafter, also referred to simply as a "conjugated diene block region"). The aromatic vinyl block region is formed by only an aromatic vinyl monomer unit. The conjugated diene block region is preferably formed by only a conjugated diene monomer unit but may, besides the conjugated diene monomer unit, include an alkylene structural unit. Moreover, the conjugated diene block region may include an extremely small amount of a constitutional unit other than the conjugated diene monomer unit and the alkylene structural unit. The proportion of such other constitutional units is preferably 30 mass % or less when the amount of all repeating units in the block copolymer is taken to be 100 mass %.

The aromatic vinyl block region and the conjugated diene block region are present adjacently to one another in the block copolymer. The copolymer can include one aromatic vinyl block region or a plurality of aromatic vinyl block regions. Likewise, the copolymer can include one conjugated diene block region or a plurality of conjugated diene block regions. The copolymer may also include other regions.

The particulate polymer A including the aromatic vinyl block region and the conjugated diene block region has both rigidity and flexibility, and can favorably follow expansion and contraction of an electrode active material accompanying repeated charging and discharging of a secondary battery.

[Aromatic Vinyl Block Region]

The aromatic vinyl block region is a region that essentially includes only an aromatic vinyl monomer unit as a repeating unit as previously described.

Note that a single aromatic vinyl block region may be composed of just a single type of aromatic vinyl monomer unit or may be composed of a plurality of types of aromatic vinyl monomer units, but is preferably composed of just a single type of aromatic vinyl monomer unit.

Moreover, a single aromatic vinyl block region may include a coupling moiety (i.e., aromatic vinyl monomer units of a single aromatic vinyl block region may be linked with a coupling moiety interposed in-between).

In a case in which the block copolymer includes a plurality of aromatic vinyl block regions, the types and proportions of aromatic vinyl monomer units in the plurality of aromatic vinyl block regions may be the same or different, but are preferably the same.

Examples of aromatic vinyl monomers that can form an aromatic vinyl monomer unit of the aromatic vinyl block region in the block copolymer include styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually. In particular, styrene is preferable.

The proportion constituted by the aromatic vinyl monomer unit in the block copolymer when the amount of all repeating units in the block copolymer (monomer units and structural units; inclusive of graft portion repeating units in a case in which the block copolymer includes a graft portion) is taken to be 100 mass % is preferably 10.0 mass % or more, more preferably 12.0 mass % or more, and even more preferably 15.0 mass % or more, and is preferably 30.0 mass % or less, more preferably 28.0 mass % or less, and even more preferably 26.0 mass % or less. Note that the proportion constituted by the aromatic vinyl monomer unit in the block copolymer is normally the same as the proportion constituted by the aromatic vinyl block region in the block copolymer.

When the proportion constituted by the aromatic vinyl monomer unit in the block copolymer is not less than any of the lower limits set forth above, it is possible to increase close adherence between an electrode active material and the particulate polymer A when an electrode is formed and to effectively inhibit swelling of the electrode accompanying repeated charging and discharging. Moreover, when the proportion constituted by the aromatic vinyl monomer unit is not less than any of the lower limits set forth above, slurry stability of a slurry composition containing the binder composition can be increased, and battery characteristics such as low-temperature output characteristics and cycle characteristics of an obtained secondary battery can be enhanced. Furthermore, when the proportion constituted by the aromatic vinyl monomer unit in the block copolymer is not more than any of the upper limits set forth above, it is possible to form an electrode having high affinity with electrolyte solution. Note that the affinity of an electrode with electrolyte solution tends to be lower in a case in which the electrode is densified.

However, an electrode formed using the presently disclosed binder composition has high affinity with electrolyte solution even in a situation in which the electrode is densified. Consequently, an electrode formed using the presently disclosed binder composition has high electrolyte solution injectability.

[Aliphatic Conjugated Diene Block Region]

The aliphatic conjugated diene block region is a region essentially including an aliphatic conjugated diene monomer unit having a carbon number of 4 or more (hereinafter, also referred to simply as an "aliphatic conjugated diene monomer unit") as a repeating unit as previously described.

A single aliphatic conjugated diene block region can be composed of a single type of aliphatic conjugated diene monomer unit or a plurality of types of aliphatic conjugated diene monomer units.

Moreover, a single aliphatic conjugated diene block region may include a coupling moiety (i.e., aliphatic conjugated diene monomer units of a single aliphatic conjugated diene block region may be linked with a coupling moiety interposed in-between).

In a case in which the block copolymer includes a plurality of aliphatic conjugated diene block regions, the types and proportions of aliphatic conjugated diene monomer units in the plurality of aliphatic conjugated diene block regions may be the same or different.

Examples of the aliphatic conjugated diene monomer unit of the aliphatic conjugated diene block region of the block copolymer include conjugated diene compounds having a carbon number of 4 or more such as 1,3-butadiene, isoprene, 2,3-dimethyl-1,3-butadiene, and 1,3-pentadiene. One of these conjugated diene compounds may be used individually, or two or more of these conjugated diene compounds may be used in combination. Of these conjugated diene compounds, 1,3-butadiene and isoprene are preferable, and isoprene is particularly preferable from a viewpoint of further improving process adhesiveness of a battery component.

The proportion constituted by the aliphatic conjugated diene monomer unit in the block copolymer when the amount of all repeating units in the block copolymer is taken to be 100 mass % is preferably 50.0 mass % or more, more preferably 55.0 mass % or more, and even more preferably 60.0 mass % or more, and is preferably 90.0 mass % or less, more preferably 87.5 mass % or less, and even more preferably 85.0 mass % or less. When the proportion constituted by the aliphatic conjugated diene monomer unit in the block copolymer is not less than any of the lower limits set forth above, the block copolymer can be provided with a suitable degree of flexibility. This can improve ability to follow expansion and contraction of an electrode active material accompanying repeated charging and discharging by increasing the flexibility of an obtained electrode, and, as a result, can effectively inhibit swelling of the electrode. Moreover, when the proportion constituted by the aliphatic conjugated diene monomer unit in the block copolymer is not more than any of the upper limits set forth above, it is possible to prevent the block copolymer from becoming too flexible and to enhance cycle characteristics of an obtained secondary battery.

The aliphatic conjugated diene monomer unit may include an alkylene structural unit. The alkylene structural unit is a repeating unit composed only of an alkylene structure represented by a general formula —$C_nH_{2n}$— (n is an integer of 2 or more).

Although the alkylene structural unit may be linear or branched, the alkylene structural unit is preferably linear (i.e., is preferably a linear alkylene structural unit). Moreover, the alkylene structural unit preferably has a carbon number of 4 or more (i.e., n in the preceding general formula is preferably an integer of 4 or more).

No specific limitations are placed on the method by which the alkylene structural unit is introduced into the aliphatic conjugated diene block region. For example, a method in which a polymer including an aliphatic conjugated diene block region is hydrogenated so that an aliphatic conjugated diene monomer unit included in the aliphatic conjugated diene block region is converted to an alkylene structural unit may be adopted.

—Graft Portion—

The aliphatic conjugated diene block region of the particulate polymer A preferably includes a graft portion. In other words, the particulate polymer A preferably has a structure in which a polymer that becomes a graft portion is bonded to an aliphatic conjugated diene block region of a chain portion including an aromatic vinyl block region and an aliphatic conjugated diene block region, which corresponds to a "trunk portion". The inclusion of a graft portion in the particulate polymer A can inhibit aggregation of compounded components such as an electrode active material during application of a slurry composition for a non-aqueous secondary battery electrode that is produced using the binder composition. This is presumed to be due to the graft portion physically inhibiting surface contact amongst the particulate polymer A and between the particulate polymer A and other components.

Examples of repeating units that can be included in the graft portion of the particulate polymer A include an acidic group-containing monomer unit, a (meth)acrylic acid ester monomer unit, and an aromatic vinyl monomer unit.

Examples of acidic group-containing monomers include monomers that have an acidic group such as carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", and "(meth)acryloyl" is used to indicate "acryloyl" and/or "methacryloyl".

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of aromatic vinyl monomers include the same aromatic vinyl monomers as can be used in formation of the aromatic vinyl block region.

The various monomers described above that can be used to form repeating units included in the graft portion of the block copolymer may be one type used individually or two or more types used in combination. A carboxy group-containing monomer is preferable as an acidic group-containing monomer for forming an acidic group-containing monomer unit included in the graft portion of the block copolymer. Of carboxy group-containing monomers, methacrylic acid, itaconic acid, and acrylic acid are more preferable, and methacrylic acid is particularly preferable.

No specific limitations are placed on the method by which the graft portion is introduced into the block copolymer. For example, a block copolymer having a structure in which a polymer of a graft portion is bonded to an aliphatic conjugated diene monomer unit of a polymer of a trunk portion can be obtained by producing the specific block copolymer set forth above and then performing graft polymerization of an acidic group-containing monomer such as set forth above, or the like, by a known method, with the produced block copolymer as a trunk portion.

In a case in which the block copolymer includes a graft portion, the proportion constituted by an acidic group-containing monomer unit included in the graft portion in the block copolymer when the amount of all repeating units in the block copolymer is taken to be 100 mass % is preferably 0.1 mass % or more, more preferably 0.2 mass % or more, and even more preferably 0.5 mass % or more, and is preferably 30.0 mass % or less, more preferably 15.0 mass % or less, and even more preferably 5.0 mass % or less.

When the proportion constituted by the acidic group-containing monomer unit is not less than any of the lower limits set forth above, slurry stability of a slurry composition containing the binder composition can be increased, and thus coating density when the slurry composition is applied onto a substrate to form an electrode can be increased. Moreover, aggregation of compounded components such as an electrode active material in an obtained electrode can be well inhibited, and, as a result, low-temperature output characteristics and cycle characteristics of a secondary battery including the obtained electrode can be improved. Also, when the proportion constituted by the acidic group-containing monomer unit is not less than any of the lower limits set forth above, affinity with electrolyte solution of an electrode that can be formed using a slurry composition containing the binder composition can be improved, which enables formation of a secondary battery having good electrolyte solution injectability. Furthermore, when the proportion constituted by the acidic group-containing monomer unit is not more than any of the upper limits set forth above, an electrode that can be formed using a slurry composition containing the binder composition can be provided with higher adhesiveness to another battery component such as a separator, and, as a result, swelling of the electrode accompanying repeated charging and discharging can be effectively inhibited.

[Diblock Content]

The block copolymer contained in the polymer particles can be composed by one or a plurality of polymer chains. The polymer chains composing the block copolymer may be any structures such as a diblock structure including one each of an aromatic block region and an aliphatic conjugated diene block region and a triblock structure including three regions (for example, a structure including an aromatic vinyl block region, an aliphatic conjugated diene block region, and an aromatic vinyl block region that are linked in this order).

The proportion constituted by diblock structures in the particulate polymer A (i.e., the diblock content) when the mass of the overall block copolymer is taken to be 100 mass % is preferably 1 mass % or more, preferably 3 mass % or more, and more preferably 5 mass % or more, and is preferably 60 mass % or less, preferably 50 mass % or less, and more preferably 40 mass % or less. When the diblock content in the particulate polymer A is not less than any of the lower limits set forth above, an excessive increase in internal stress of an obtained electrode can be inhibited, and swelling of the electrode accompanying charging and discharging can be effectively inhibited. Moreover, when the diblock content in the particulate polymer A is not more than any of the upper limits set forth above, an electrode that can be formed using a slurry composition containing the binder composition can be provided with higher adhesiveness to another battery component such as a separator, and, as a result, swelling of the electrode accompanying repeated charging and discharging can be effectively inhibited.

The diblock content can be reduced by carrying out a subsequently described coupling reaction in production of the block copolymer, for example. Moreover, the diblock content can be adjusted by altering the type and amount of a coupling agent used in production of the block copolymer. Note that the diblock content can be measured by a method described in the EXAMPLES section of the present specification.

[Volume-Average Particle Diameter]

The volume-average particle diameter of the particulate polymer A is preferably 0.10 μm or more, more preferably 0.12 μm or more, and even more preferably 0.15 μm or more, and is preferably 5.00 μm or less, more preferably 2.00 μm or less, and even more preferably 1.50 μm or less. When the volume-average particle diameter of the particulate polymer A is not less than any of the lower limits set forth above, close adherence between an electrode and another battery component such as a separator can be increased, and electrode swelling accompanying charging and discharging can be effectively inhibited. Moreover, when the volume-average particle diameter of the particulate polymer A is not more than any of the upper limits set forth above, an excessive decrease in specific surface area of the particulate polymer A can be inhibited, adhesive ability that can be displayed by the particulate polymer A can be sufficiently increased, and, as a result, cycle characteristics of an obtained secondary battery can be improved.

Note that the volume-average particle diameter of the particulate polymer A can be measured by a method described in the EXAMPLES section of the present specification.

<<Production Method of Particulate Polymer A>>

The particulate polymer A is preferably produced by, for example, block polymerizing the monomers set forth above in an organic solvent to obtain a solution of a block copolymer, and then adding water to the obtained solution of the block copolymer and performing emulsification (i.e., phase-inversion emulsification) to form particles of the block polymer and obtain a water dispersion of polymer particles. In addition, graft polymerization is preferably performed with respect to the block copolymer. The block polymer can also be hydrogenated as necessary.

No specific limitations are placed on the method of block polymerization in production of the block copolymer. For example, production may be carried out by polymerizing a first monomer component, adding a second monomer component, differing from the first monomer component, to the resultant solution and performing polymerization thereof, and further repeating addition and polymerization of monomer components as necessary. The organic solvent used as the reaction solvent is not specifically limited and can be selected as appropriate depending on the types of monomers and so forth.

The block copolymer obtained through block polymerization as described above is preferably subjected to a coupling reaction using a coupling agent. The coupling reaction can, for example, cause the terminals of diblock structures contained in the block copolymer to bond to one another through the coupling agent to thereby convert the diblock structures to a triblock structure (i.e., the diblock content can be reduced).

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable from a viewpoint that a block copolymer having a diblock content within a specific range can easily be produced. Note that through the coupling reaction using a coupling agent, a coupling moiety derived from the coupling agent is introduced into a polymer chain (for example, a triblock structure) of the block copolymer.

In a case in which a particulate polymer A including a graft portion is produced, examples of methods by which the graft portion may be grafted with respect to a block copolymer that becomes a trunk portion include, but are not specifically limited to, a method in which polymerization of a monomer composition containing monomers such as previously described is carried out on a block copolymer that becomes a trunk portion and a method in which a macromer obtained through polymerization of a monomer composition containing monomers such as previously described is caused to bond to a polymer that becomes trunk portion.

In a case in which the particulate polymer A, a polymer that becomes a trunk portion thereof, or the like is produced through artificial polymerization of a monomer composition, the proportion constituted by each monomer in the monomer composition is normally the same as the proportion constituted by each monomer unit in the target polymer. No specific limitations are placed on the method of polymerization of these polymers. For example, any of solution polymerization, suspension polymerization, bulk polymerization, and emulsion polymerization may be adopted. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used.

Although no specific limitations are placed on the method of emulsification of the block copolymer, a method involving phase-inversion emulsification of a preliminary mixture of a solution of the block copolymer obtained as described above and an aqueous solution of an emulsifier is preferable. The phase-inversion emulsification can be carried out, for example, using a known emulsifier and a known emulsifying and dispersing device.

A water dispersion of the particulate polymer A can then be obtained by, as necessary, using a known method to remove organic solvent from the emulsion that is obtained after phase-inversion emulsification.

<Particulate Polymer B>

In an electrode produced by forming an electrode mixed material layer on a current collector using a slurry composition for a non-aqueous secondary battery electrode that is produced using the binder composition, the particulate polymer B holds components contained in the electrode mixed material layer to prevent these components detaching from the electrode mixed material layer (i.e., the particulate polymer B functions as a binder in conjunction with the particulate polymer A set forth above). The particulate polymer B is in the form of water-insoluble particles.

<<Structure and Chemical Composition>>

The particulate polymer B is a random copolymer including a (meth)acrylic acid ester monomer unit in a proportion of not less than 20.0 mass % and not more than 80.0 mass %. The particulate polymer B is a polymer that itself has high flexibility and that can improve stability of a slurry composition containing the binder composition as a result of enabling good dispersion of solid content in a dispersion medium such as water. Note that the particulate polymer B can include other monomer units besides the (meth)acrylic acid ester monomer unit. Moreover, the particulate polymer B is a random copolymer in which more than 90% is composed by a random region.

[(Meth)Acrylic Acid Ester Monomer Unit]

Examples of (meth)acrylic acid ester monomers that can form the (meth)acrylic acid ester monomer unit of the particulate polymer B include, but are not specifically limited to, the same (meth)acrylic acid ester monomers as can be used in formation of the graft portion of the particulate polymer A. Of these (meth)acrylic acid ester monomers, 2-ethylhexyl (meth)acrylate and n-butyl (meth)acrylate are preferable, and 2-ethylhexyl acrylate is more preferable.

The proportion constituted by the (meth)acrylic acid ester monomer unit in the particulate polymer B when the amount of all repeating units in the particulate polymer B is taken to be 100 mass % is required to be not less than 20.0 mass % and not more than 80.0 mass %, is preferably 25.0 mass % or more, and more preferably 30.0 mass % or more, and is preferably 77.5 mass % or less, more preferably 75.0 mass % or less, and even more preferably 72.5 mass % or less. When the proportion constituted by the (meth)acrylic acid ester monomer unit in the particulate polymer B is not less than any of the lower limits set forth above, low-temperature output characteristics of an obtained secondary battery can be improved through a suitable increase in the degree of swelling. Moreover, when the proportion constituted by the (meth)acrylic acid ester monomer unit in the particulate polymer B is not less than any of the lower limits set forth above, solid content dispersing ability that can be displayed by the particulate polymer B in a slurry increases, and, as a result, electrolyte solution injectability of an electrode obtained using the slurry composition can be improved. Furthermore, when the proportion constituted by the (meth)acrylic acid ester monomer unit in the particulate polymer B is not more than any of the upper limits set forth above, an excessive decrease in close adherence between an obtained electrode and another battery component such as a separator can be inhibited, and, as a result, cycle characteristics of an obtained secondary battery can be improved.

[Other Monomer Units]

—Aromatic Vinyl Monomer Unit and Vinyl Cyanide Monomer Unit—

The particulate polymer B preferably further includes a monomer unit selected from an aromatic vinyl monomer unit and a vinyl cyanide monomer unit in addition to the (meth)acrylic acid ester monomer unit.

Examples of aromatic vinyl monomers that can be used to form the aromatic vinyl monomer unit include the same monomers as can be used in formation of the aromatic vinyl block region of the particulate polymer A. One of these aromatic vinyl monomers may be used individually, or two or more of these aromatic vinyl monomers may be used in combination. Of these aromatic vinyl monomers, styrene is preferable.

Examples of vinyl cyanide monomers that can be used to form the vinyl cyanide monomer unit include acrylonitrile, methacrylonitrile, α-chloroacrylonitrile, and α-ethylacrylonitrile. One of these vinyl cyanide monomers may be used individually, or two or more of these vinyl cyanide monomers may be used in combination. Of these vinyl cyanide monomers, acrylonitrile and methacrylonitrile are preferable.

In a case in which the particulate polymer B includes a monomer unit selected from an aromatic vinyl monomer unit and a vinyl cyanide monomer unit, the proportion in which the monomer unit is included in the particulate polymer B when all repeating units included in the particulate polymer B are taken to be 100 mass % is preferably 10.0 mass % or more, more preferably 15.0 mass % or more, and even more preferably 20.0 mass % or more, and is preferably 70.0 mass % or less, more preferably 65.0 mass % or less, and even more preferably 60.0 mass % or less. Note that in a case in which the particulate polymer B includes only one out of an aromatic vinyl monomer unit and a vinyl cyanide monomer unit, the proportion in which that monomer unit is included preferably satisfies any of the ranges set forth above, and in a case in which the particulate polymer B includes both an aromatic vinyl monomer unit and a vinyl cyanide monomer unit, the total amount of both types of monomer units preferably satisfies any of the ranges set forth above. When the proportion in which a monomer unit selected from an aromatic vinyl monomer unit and a vinyl cyanide monomer unit is included in the particulate polymer B is not less than any of the lower limits set forth above, close adherence between an electrode and another battery component such as a separator can be increased, and, as a result, cycle characteristics of an obtained secondary battery can be enhanced. Moreover, when the proportion in which a monomer unit selected from an aromatic vinyl monomer unit and a vinyl cyanide monomer unit is included in the particulate polymer B is not more than any of the upper limits set forth above, an excessive decrease in flexibility of an obtained electrode can be inhibited, and, as a result, cycle characteristics of an obtained secondary battery can be enhanced.

—Acidic Group-Containing Monomer Unit—

The particulate polymer B preferably further includes an acidic group-containing monomer unit. Examples of acidic group-containing monomers that can be used to form the acidic group-containing monomer unit include the same acidic group-containing monomers as can be used to form the graft portion of the previously described particulate polymer A. One of these acidic group-containing monomers may be used individually, or two or more of these acidic group-containing monomers may be used in combination. Of these acidic group-containing monomers, (meth)acrylic acid and itaconic acid are preferable.

In a case in which the particulate polymer B includes an acidic group-containing monomer unit, the proportion in which the acidic group-containing monomer unit is included in the particulate polymer B when all repeating units included in the particulate polymer B are taken to be 100 mass % is preferably 1.0 mass % or more, more preferably 1.5 mass % or more, and even more preferably 2.0 mass % or more, and is preferably 15.0 mass % or less, more preferably 10.0 mass % or less, and even more preferably 8.0 mass % or less. When the proportion constituted by the acidic group-containing monomer unit is not less than any of the lower limits set forth above, slurry stability can be increased, and, as a result, low-temperature output characteristics of a secondary battery including an obtained electrode can be improved. Moreover, when the proportion constituted by the acidic group-containing monomer unit is not less than any of the lower limits set forth above, affinity with electrolyte solution of an electrode that can be formed using a slurry composition containing the binder composition can be improved, and thus a secondary battery having good electrolyte solution injectability can be formed. Furthermore, when the proportion constituted by the acidic group-containing monomer unit is not more than any of the upper limits set forth above, an obtained electrode can be provided with higher adhesiveness to another battery component such as a separator, and, as a result, swelling of the electrode accompanying repeated charging and discharging can be effectively inhibited.

—Others—

Besides the monomer units set forth above, the particulate polymer B may include any monomer unit that is copolymerizable with various monomer units such as set forth above. Examples of such monomer units include ethylenically unsaturated carboxylic acid ester monomers and cross-linkable monomers. One of these may be used individually, or two or more of these may be used in combination.

The ethylenically unsaturated carboxylic acid ester monomer may, for example, be an ethylenically unsaturated carboxylic acid ester monomer that includes a polar group. Examples of polar group-containing ethylenically unsaturated carboxylic acid ester monomers include hydroxyalkyl esters of (meth)acrylic acid and glycidyl (meth)acrylate. Examples of hydroxyalkyl esters of (meth)acrylic acid include 2-hydroxyethyl (meth)acrylate and 2-hydroxypropyl (meth)acrylate. Of these examples, 2-hydroxyethyl (meth) acrylate is preferable.

Examples of cross-linkable monomers that can be used include monomers that display cross-linkability such as divinylbenzene, allyl glycidyl ether, allyl methacrylate, and N-methylolacrylamide.

[Volume-Average Particle Diameter]

The volume-average particle diameter of the particulate polymer B is preferably 0.01 μm or more, more preferably 0.03 μm or more, and even more preferably 0.05 μm or more, and is preferably 1.00 μm or less, more preferably 0.80 μm or less, and even more preferably 0.50 μm or less. When the volume-average particle diameter of the particulate polymer B is not less than any of the lower limits set forth above, close adherence between an electrode and another battery component such as a separator can be increased, and electrode swelling accompanying charging and discharging can be effectively inhibited. Moreover, when the volume-average particle diameter of the particulate polymer B is not more than any of the upper limits set forth above, an excessive decrease in specific surface area of the particulate polymer B can be inhibited, adhesive ability that can be displayed by the particulate polymer B can be sufficiently increased, and, as a result, cycle characteristics of an obtained secondary battery can be improved.

Note that the volume-average particle diameter of the particulate polymer B can be measured by a method described in the EXAMPLES section of the present specification.

<Content Ratio of Particulate Polymer A and Particulate Polymer B>

The content of the particulate polymer A in the presently disclosed binder composition when the total content of the particulate polymer A and the particulate polymer B is taken to be 100 mass % is preferably 20 mass % or more, more preferably 25 mass % or more, and even more preferably 30 mass % or more, and is preferably 80 mass % or less, more preferably 75 mass % or less, and even more preferably 70 mass % or less. When the content ratio of the particulate polymer A is not less than any of the lower limits set forth above, cycle characteristics of an obtained secondary battery can be improved. Moreover, when the content ratio of the particulate polymer A is not more than any of the upper limits set forth above, low-temperature output characteristics of an obtained secondary battery can be enhanced. Furthermore, when the content ratio of the particulate polymer A is not more than any of the upper limits set forth above (i.e., when the particulate polymer B is used in combination therewith in at least a certain ratio), dispersibility of solid content such as an electrode active material in a slurry can be improved, an electrode having high electrode active material density can be well formed, and electrolyte solution injectability with respect to an obtained secondary battery can be improved.

<Solvent>

The presently disclosed binder composition can further contain a solvent such as water. Examples of solvents that can be used include water, an aqueous solution containing water, and a mixed solution of water and a small amount of an organic solvent. Of these solvents, water is preferable.

<Other Components>

The presently disclosed binder composition can contain components other than those described above (i.e., other components). For example, the binder composition may contain a known particulate binder (for example, a styrene-butadiene random copolymer) other than the particulate polymer A and the particulate polymer B set forth above. In a case in which the binder composition contains a known particulate binder other than the particulate polymer A and the particulate polymer B, the content of this particulate polymer is required to be less than the content of the particulate polymer A and the content of the particulate polymer B, and is preferably 10 mass % or less of the total content of the particulate polymer A and the particulate polymer B.

The binder composition may also contain known additives. Examples of such known additives include antioxidants such as 2,6-di-tert-butyl-p-cresol, defoamers, and dispersants. One other component may be used individually, or two or more other components may be used in combination in a freely selected ratio.

<Production Method of Binder Composition>

The presently disclosed binder composition can be produced, without any specific limitations, by mixing the particulate polymer A, the particulate polymer B, and optionally used other components in the presence of a solvent such as water. Note that in a case in which dispersion liquids of the particulate polymer A and the particulate polymer B are used in production of the binder composition, liquid content of these dispersion liquids may be used as the solvent of the binder composition.

(Slurry Composition for Non-Aqueous Secondary Battery Electrode)

The presently disclosed slurry composition for a non-aqueous secondary battery electrode contains an electrode active material and the presently disclosed binder composition for a non-aqueous secondary battery electrode set forth above, and may optionally further contain other components. In other words, the presently disclosed slurry composition for a non-aqueous secondary battery electrode normally contains an electrode active material, the previously described particulate polymers A and B, and the previously described solvent, and may optionally further contain other components. When the presently disclosed slurry composition for a non-aqueous secondary battery electrode is used to form an electrode mixed material layer of an electrode, the electrode active material can be well dispersed and an electrode mixed material layer having comparatively high density can be well formed as a result of the presently disclosed slurry composition for a non-aqueous secondary battery electrode containing the binder composition set forth above. Consequently, a non-aqueous secondary battery can be caused to display excellent battery characteristics, and particularly low-temperature cycle characteristics and low-temperature output characteristics, by using an electrode formed using the presently disclosed slurry composition for a non-aqueous secondary battery electrode.

Although the following describes, as one example, a case in which the slurry composition for a non-aqueous secondary battery electrode is a slurry composition for a lithium ion secondary battery negative electrode, the presently disclosed slurry composition for a non-aqueous secondary battery electrode is not limited to the following example.

<Electrode Active Material>

The electrode active material is a material that gives and receives electrons in an electrode of a secondary battery. The negative electrode active material of a lithium ion secondary battery is normally a material that can occlude and release lithium.

More specifically, the negative electrode active material of a lithium ion secondary battery may, for example, be a carbon-based negative electrode active material, a metal-based negative electrode active material, or a negative electrode active material that is a combination thereof.

Examples of carbonaceous materials include graphitizing carbon and non-graphitizing carbon, typified by glassy carbon, which has a structure similar to an amorphous structure.

Examples of the graphitizing carbon include carbon materials made from tar pitch obtained from petroleum or coal. Specific examples include coke, meso-carbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials that can be used include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti) and alloys thereof, and oxides, sulfides, nitrides, silicides, carbides, and phosphides of any of the preceding examples. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

Examples of silicon-based negative electrode active materials include silicon (Si), silicon-containing alloys, SiO, $SiO_x$, and a composite of a Si-containing material and conductive carbon obtained by coating or compositing the Si-containing material with the conductive carbon. One of these silicon-based negative electrode active materials may be used individually, or two or more of these silicon-based negative electrode active materials may be used in combination.

<Other Components>

Examples of other components that may be contained in the slurry composition include, but are not specifically limited to, the same other components as may be contained in the presently disclosed binder composition. One of such other components may be used individually, or two or more of such other components may be used in combination in a freely selected ratio.

<Production of Slurry Composition for Non-Aqueous Secondary Battery Electrode>

The slurry composition set forth above can be produced by dispersing or dissolving the components described above in a solvent such as water. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Mixing of the above-described components and the solvent can normally be performed for 10 minutes to several hours in a temperature range of room temperature to 80° C. In production of the slurry composition, the amount of the binder composition, in terms of solid content, can be set as not less than 0.5 parts by mass and not more than 15 parts by mass per 100 parts by mass of the electrode active material. The solvent used in production of the slurry composition can be any of the same types as for the binder composition. Moreover, the solvent used in production of the slurry composition can contain solvent that was contained in the binder composition.

(Electrode for Non-Aqueous Secondary Battery)

The presently disclosed electrode for a non-aqueous secondary battery includes an electrode mixed material layer formed using the slurry composition for a non-aqueous secondary battery electrode set forth above, and normally includes a substrate such as a current collector and an electrode mixed material layer of 1.70 $g/cm^3$ or more in density that is formed on the substrate. The electrode mixed material layer contains at least an electrode active material and the previously described particulate polymers A and B. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition.

The presently disclosed electrode for a non-aqueous secondary battery is an electrode that is formed using a slurry composition containing the presently disclosed binder composition for a non-aqueous secondary battery electrode. Consequently, the presently disclosed electrode for a non-aqueous secondary battery is a high-density electrode having a density of 1.70 $g/cm^3$ or more that can enhance low-temperature output characteristics and cycle characteristics of a secondary battery. The density of the electrode for a non-aqueous secondary battery is preferably 1.72 $g/cm^3$ or more. When the density is not less than any of the lower limits set forth above, a secondary battery including the electrode can be provided with an even higher capacity than conventional secondary batteries.

<Formation of Electrode for Non-Aqueous Secondary Battery>

The presently disclosed electrode for a non-aqueous secondary battery can be produced, for example, through a step of applying the previously described slurry composition onto a substrate such as a current collector (application step) and a step of drying the slurry composition that has been applied onto the substrate to form an electrode mixed material layer on the substrate (drying step).

[Application Step]

The slurry composition can be applied onto the substrate by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the substrate. The thickness of the slurry coating on the substrate after application but before drying may be set as appropriate in accordance with the thickness of the electrode mixed material layer that is to be obtained after drying.

[Drying Step]

The slurry composition on the substrate may be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition on the substrate in this manner forms an electrode mixed material layer on the substrate and thereby provides an electrode for a secondary battery that includes the substrate and the electrode mixed material layer.

After the drying step, the electrode mixed material layer is preferably further subjected to a pressing process by mold pressing, roll pressing, or the like. The pressing process can improve close adherence of the electrode mixed material layer and the substrate and can increase the density of the electrode mixed material layer. In particular, the presently disclosed slurry composition set forth above is suitable for formation of an electrode mixed material layer that is densified by a pressing process due to the suitable degree of flexibility and good solid content dispersing ability that can be displayed by the particulate polymer B contained therein. Moreover, an electrode formed using the presently disclosed slurry composition has high affinity with electrolyte solution. Therefore, the presently disclosed electrode formed using this slurry composition has high electrolyte solution injectability during secondary battery production while also having a high density of 1.70 $g/cm^3$ or more.

Note that in a case in which the electrode mixed material layer contains a curable polymer, the polymer is preferably cured after formation of the electrode mixed material layer.

(Non-Aqueous Secondary Battery)

The presently disclosed non-aqueous secondary battery includes a positive electrode, a negative electrode, an electrolyte solution, and a separator, wherein the presently disclosed electrode for a non-aqueous secondary battery is used as at least one of the positive electrode and the negative electrode. The presently disclosed non-aqueous secondary battery has excellent battery characteristics such as low-temperature output characteristics and cycle characteristics as a result of including the presently disclosed electrode for a non-aqueous secondary battery.

Although the following describes, as one example, a case in which the secondary battery is a lithium ion secondary battery, the presently disclosed secondary battery is not limited to the following example.

<Electrodes>

As described above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode. In particular, it is preferable that at least the negative electrode is the presently disclosed electrode for a non-aqueous secondary battery.

Note that when a known electrode other than the presently disclosed electrode for a non-aqueous secondary battery is used, this electrode may be an electrode that is obtained by forming an electrode mixed material layer on a substrate such as a current collector by a known production method.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Known additives such as vinylene carbonate (VC), fluoroethylene carbonate, and ethyl methyl sulfone can be added to the electrolyte solution.

<Separator>

The separator may be a separator such as described in JP 2012-204303 A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production of Non-Aqueous Secondary Battery>

The presently disclosed non-aqueous secondary battery can be produced by, for example, stacking the positive electrode and the negative electrode with the separator in-between, performing rolling, folding, or the like of the resultant stack as necessary in accordance with the battery shape, placing the stack in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the proportion in a particulate polymer A constituted by an acidic group-containing monomer unit included in a graft portion was evaluated as described below.

Moreover, the following methods were used in the examples and comparative examples to measure the volume-average particle diameter of particulate polymers A and B, the diblock content of a particulate polymer A, and the content ratio of particulate polymers A and B.

Furthermore, the following methods were used in the examples and comparative examples to evaluate the stability of a slurry composition (slurry stability), the swelling and electrolyte solution injectability of an electrode, and the low-temperature output characteristics and cycle characteristics of a secondary battery.

<Proportion in Particulate Polymer A Constituted by Acidic Group-Containing Monomer Unit Included in Graft Portion>

For a particulate polymer A produced in each of Examples 1 to 9 and 11 to 17, and Comparative Examples 1 and 3 to 5, the proportion in the overall particulate polymer A constituted by an acidic group-containing monomer unit included in a graft portion was determined by performing centrifugal separation of a water dispersion present after a grafting reaction to remove acidic group-containing monomer that had not undergone grafting reaction, subsequently measuring the surface acid content of the particulate polymer A, and then determining the aforementioned proportion based on the measured surface acid content.

<Volume-Average Particle Diameter of Particulate Polymers A and B>

The volume-average particle diameter D50 of each particulate polymer A or B produced in the examples and comparative examples was determined as a particle diameter (μm) at which, in a particle size distribution (volume basis) measured by a laser diffraction particle diameter distribution analyzer (produced by Beckman Coulter, Inc.; product name: LS-230) with respect to a water dispersion adjusted to a solid content concentration of 0.1 mass %, cumulative volume calculated from a small diameter end of the distribution reached 50%.

<Diblock Content of Particulate Polymer A>

The diblock content of a particulate polymer A was calculated based on polystyrene-equivalent molecular weight obtained by high-performance liquid chromatography (apparatus: HLC8220 (model no.) produced by Tosoh Corporation). Moreover, in the high-performance liquid chromatography, three linked columns (Shodex KF-404HQ (model no.) produced by Showa Denko K. K.; column temperature: 40° C.; carrier: tetrahydrofuran at flow rate of 0.35 mL/min) were used, and a differential refractometer and a UV detector were used as detectors. Molecular weight calibration was performed by 12 points for standard polystyrene (produced by Polymer Laboratories Ltd.; standard molecular weight: 500 to 3,000,000). In a chart obtained by the high-performance liquid chromatography, the diblock content (mass %) was calculated based on the area proportion constituted by the area of peaks corresponding to polymer chains that were diblock structures relative to the overall chart.

<Content Ratio of Particulate Polymers A and B in Binder Composition>

A binder composition produced in each example or comparative example was dried in the form of a film to obtain a test specimen. The test specimen was sectioned by a standard method and then the sectioned surface was observed using an atomic force microscope (unit: SPA400; probe station: SPI3800N; cantilever: SI-DF40; measurement mode: SIS-DFM). A square region having a side length of 3 µm was arbitrarily selected in the sectioned surface of the test specimen observed using the atomic force microscope, and a viscoelasticity distribution was measured to perform mapping. Based on the mapping results, the area ratio of regions displaying viscoelasticities corresponding respectively to the particulate polymers A and B was calculated, and thus a content ratio (mass basis) of the particulate polymers A and B was measured.

<Slurry Stability>

Various components were prepared in the same way as in production of a slurry composition for a non-aqueous secondary battery negative electrode in each example or comparative example. A mixture was then obtained in the same way as in each example or comparative example by adding 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. The viscosity M0 (mPa·s) of this mixed liquid was measured using a B-type viscometer (produced by Toki Sangyo Co., Ltd.; product name: TV-25) under measurement conditions of a measurement temperature of 25° C., a No. 4 measurement rotor, and a rotor rotation speed of 60 rpm.

On the other hand, 2.0 parts in terms of solid content of a binder composition having the same chemical composition as that produced in each example or comparative example was added to a mixed liquid having the same chemical composition as the mixed liquid for which the viscosity M0 was measured so as to obtain a solution for measurement of viscosity M1. The solution for measurement of viscosity M1 was loaded into a vessel having a diameter of 5.5 cm and a height of 8.0 cm and was stirred at a rotation speed of 3,000 rpm for 10 minutes using a TK Homo Disper (produced by PRIMIX Corporation; disper blade diameter: 40 mm). After stirring, the viscosity M1 (mPa·s) of the slurry composition was measured. The stability of the slurry composition was calculated as $\Delta M = M1/M0$ (times) and then slurry stability was evaluated by the following standard. A smaller value indicates that the slurry composition has higher stability.

A: $\Delta M \leq 1.0$ times

B: $1.0$ times $< \Delta M < 1.2$ times

C: $1.2$ times $\leq \Delta M$

<Electrode Swelling>

After 100 cycles of repeated charging and discharging, a secondary battery was charged at 1 C in a 25° C. environment. The secondary battery was dismantled in a charged state to remove the negative electrode, and the thickness (d2) of the negative electrode (excluding the thickness of the current collector) was measured. The rate of change relative to the thickness (d0) of the negative electrode (excluding the thickness of the current collector) before production of the lithium ion secondary battery (electrode swelling=$\{(d2-d0)/d0\} \times 100 (\%)$) was calculated and was judged by the following standard. A smaller rate of change indicates less swelling of the negative electrode after cycling.

A: Rate of change of less than 25%

B: Rate of change of not less than 25% and less than 30%

C: Rate of change of not less than 30% and less than 35%

D: Rate of change of 35% or more

<Electrolyte Solution Injectability>

The negative electrode mixed material layer side of a negative electrode web produced in each example or comparative example was roll pressed with a line pressure of 14 t (tons) in an environment having a temperature of 25±3° C. to adjust the electrode mixed material layer density to 1.75 g/cm$^3$. A circle of 16 mm in diameter was cut out from the produced negative electrode for a secondary battery and then 1 µL of propylene carbonate (reagent produced by Kishida Chemical Co., Ltd.) was dripped onto the surface at which the negative electrode mixed material layer was located. The time taken for the droplet of propylene carbonate on the negative electrode to penetrate into the negative electrode mixed material layer after dripping (penetration time) was measured by eye and was evaluated by the following standard. A shorter penetration time indicates better affinity between the negative electrode and propylene carbonate contained in a typical electrolyte solution, and thus indicates better electrolyte solution injectability during secondary battery production.

A: Penetration time of less than 110 s

B: Penetration time of not less than 110 s and less than 130 s

C: Penetration time of not less than 130 s and less than 150 s

D: Penetration time of 150 s or more

<Low-Temperature Output Characteristics>

A secondary battery produced in each example or comparative example was left at rest in a 25° C. environment for 24 hours. The initial capacity of the secondary battery was subsequently checked. The secondary battery was fully charged to 4.35 V by CC-CV charging (cut-off condition of 0.02 C) at 25° C. and was then CC discharged to 3.0 V at 0.2 C in a −10° C. environment. The discharge capacity C1 in this discharging was obtained. The secondary battery was fully charged to 4.35 V once again by CC-CV charging (cut-off condition of 0.02 C) at 25° C. and was then CC discharged to 3.0 V at 1 C in a −10° C. environment. The discharge capacity C2 in this discharging was obtained. A capacity maintenance rate $\Delta C (=(C2/C1) \times 100)$ was calculated based on the values of C1 and C2 obtained as described above and was evaluated by the following standard. A larger value for C2/C1 indicates that the lithium ion secondary battery has better low-temperature output characteristics.

A: 55% or more

B: More than 50% and less than 55%

C: More than 45% and not more than 50%

D: 45% or less

<Cycle Characteristics>

A secondary battery produced in each example or comparative example was left at rest in a 25° C. environment for 24 hours. The secondary battery was subjected to a charge/discharge operation of charging to 4.35 V at 1 C and discharging to 3.0 V at 1 C in a 25° C. environment, and the initial capacity C'0 was measured. In addition, the secondary battery was CC-CV charged (upper limit cell voltage of 4.35 V) by a 1 C constant-current method and was CC discharged to a cell voltage of 3.00 V by a 1 C constant-current method in a 45° C. environment. This charging and discharging was repeated, and the capacity C'1 after 300 cycles was measured. High-temperature cycle characteristics were evaluated as a capacity maintenance rate expressed by ΔC'=C'1/C'0×100(%). A higher value indicates better cycle characteristics.

A: ΔC'≥80%
B: 75%≤ΔC'<80%
C: 70%≤ΔC'<75%
D: ΔC'<70%

Example 1

<Production of particulate Polymer A>
<<Block Copolymer Solution Production Step>>

A pressure-resistant reactor was charged with 233.3 kg of cyclohexane, 60.0 mmol of N,N,N',N'-tetramethylethylenediamine (hereinafter, referred to as TMEDA), and 24.7 kg of styrene as an aromatic vinyl monomer. These materials were stirred at 40° C. while 2000.0 mmol of n-butyllithium was added thereto as a polymerization initiator, and were then heated to 50° C. while polymerization was carried out for 1 hour. The polymerization conversion rate of styrene was 100%. Next, temperature control was performed to maintain a temperature of 50° C. to 60° C. while continuously adding 78.3 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%.

Next, 820.0 mmol of dichlorodimethylsilane was added into the pressure-resistant reactor as a coupling agent and a coupling reaction was performed for 2 hours to form a styrene-isoprene coupled block copolymer. Thereafter, 4000.0 mmol of methanol was added to the reaction liquid in which styrene-isoprene block copolymer having active terminals was thought to remain and was thoroughly mixed therewith to deactivate active terminals. Next, 0.3 parts of 2,6-di-tert-butyl-p-cresol as an antioxidant was added to 100 parts of the reaction liquid obtained as described above (containing 30.0 parts of polymer component) and was mixed therewith to obtain a block copolymer solution. The obtained block copolymer had a styrene content of 24 mass %, a coupling rate of 82 mass %, and a weight-average molecular weight Mw of 140,000.

<<Emulsification Step>>

First, sodium linear alkylbenzene sulfonate was dissolved in deionized water to produce an aqueous solution having a total solid content of 2 mass %.

A tank was charged with 500 g of the block copolymer solution obtained in the block copolymer solution production step and 500 g of the produced aqueous solution, and preliminary mixing of these materials was performed by stirring to obtain a preliminary mixture. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 20,000 rpm to cause phase-inversion emulsification of the preliminary mixture and obtain an emulsion.

Cyclohexane in the obtained emulsion was subsequently vacuum evaporated in a rotary evaporator. Thereafter, the emulsion resulting from this evaporation was left to separate for 1 day in a chromatographic column equipped with a stop-cock, and a lower layer portion after separation was removed to perform concentration.

Finally, an upper layer portion was filtered through a 100-mesh screen to obtain a latex (solid content concentration: 40%) containing a block copolymer including a styrene region and an isoprene region.

<<Grafting Step>>

A vessel was charged with 20 parts of methacrylic acid as an acidic group-containing monomer, the block copolymer latex containing 97 parts in terms of solid content of the block copolymer, and deionized water in an amount such that the solid content concentration was 30%. These materials were sufficiently stirred and then 0.6 parts of tetraethylenepentamine and 0.6 parts of t-butyl hydroperoxide were added into the vessel as polymerization initiators to initiate graft polymerization. The graft polymerization reaction temperature was maintained at 30° C. At 1.0 hours after the start of graft polymerization, the temperature was raised to 70° C. and was maintained at 70° C. for 2 hours. Once a polymerization conversion rate of 97% or more was confirmed, the graft polymerization reaction was terminated to yield a water dispersion (solid content concentration: 40%) containing a particulate polymer A that was a block copolymer into which a graft portion composed by only acidic group-containing monomer units had been introduced. Note that the added methacrylic acid polymerized amongst itself to form a methacrylic acid polymer, and then part of the methacrylic acid polymer that was formed bonded to an aliphatic conjugated diene block region of the block copolymer to form a graft portion. On the other hand, methacrylic acid polymer that did not bond to the block copolymer was dispersed in the water dispersion. Therefore, for the purposes of use in the subsequently described steps, the water dispersion containing the particulate polymer A that was obtained as described above was subjected to centrifugal separation to remove methacrylic acid polymer that had not bonded to the block copolymer.

<Production of Particulate Polymer B>

A polymerization can A was charged with 83.7 parts of deionized water, 0.2 parts of sodium dodecyl diphenyl ether sulfonate as an emulsifier, and 1.0 parts of ammonium persulfate as a polymerization initiator. These materials were heated to 70° C. and were stirred at a temperature of 70° C. for 30 minutes.

Next, 64.1 parts of 2-ethylhexyl acrylate as a (meth)acrylic acid ester monomer, 30.0 parts of styrene as an aromatic vinyl monomer, 4.0 parts of acrylic acid as an acidic group-containing monomer, 1.7 parts of allyl glycidyl ether as a cross-linkable monomer, 0.2 parts of allyl methacrylate as a cross-linkable monomer, 0.8 parts of sodium dodecyl diphenyl ether sulfonate as an emulsifier, and 74 parts of deionized water were added into a separate polymerization can B, and were stirred at a temperature of 25° C. to obtain an emulsion. The obtained emulsion was consecutively added from the polymerization can B to the polymerization can A over approximately 200 minutes. Thereafter, approximately 180 minutes of stirring was performed and then cooling was performed to terminate the polymerization reaction once the polymerization conversion rate was 97% or more. Next, pH adjustment was performed using 4% sodium hydroxide aqueous solution and thermal-vacuum distillation was performed to remove unreacted monomer and thereby yield a water dispersion containing a particulate polymer B that was a random copolymer including a (meth) acrylic acid ester monomer in a specific proportion.

<Production of Binder Composition for Non-Aqueous Secondary Battery Negative Electrode Mixed Material Layer>

A mixture was obtained by loading the water dispersion of the particulate polymer A obtained as described above and the water dispersion of the particulate polymer B obtained as described above into a vessel such that the mixing ratio of the particulate polymer A and the particulate polymer B was 50:50 (mass basis). The obtained mixture was stirred for 1 hour using a stirrer (produced by SHINTO Scientific Co., Ltd.; product name: Three-One Motor) to obtain a binder composition for a negative electrode mixed material layer. When the content ratio of the particulate polymer A and the particulate polymer B in the binder composition was verified by the previously described method, the content ratio was confirmed to be the same as the charging ratio.

<Production of Slurry Composition for Non-Aqueous Secondary Battery Negative Electrode Mixed Material Layer>

A mixture was obtained by adding 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.2 parts in terms of solid content of the binder composition produced as described above were added to the obtained mixed liquid, and the final solid content concentration was adjusted to 48%. Further mixing was performed for 10 minutes and then a defoaming process was carried out under reduced pressure to yield a slurry composition for a negative electrode mixed material layer having good fluidity.

<Formation of Negative Electrode>

The obtained slurry composition for a negative electrode mixed material layer was applied onto copper foil (current collector) of 15 μm in thickness by a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a negative electrode web.

The negative electrode web was rolled by roll pressing to obtain a negative electrode having a negative electrode mixed material layer thickness of 80 μm and a negative electrode mixed material layer density of 1.75 g/cm$^3$.

<Formation of Positive Electrode>

A slurry composition for a positive electrode mixed material layer was obtained by combining 100 parts of LiCoO$_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a positive electrode mixed material layer was applied onto aluminum foil (current collector) of 20 μm in thickness by a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode having a positive electrode mixed material layer thickness of 55 μm.

<Preparation of Separator>

A separator made from a single layer of polypropylene (produced by Celgard, LLC.; product name: Celgard 2500) was used as a separator.

<Production of Lithium Ion Secondary Battery>

A rectangle of 49 cm×5 cm was cut out from the obtained positive electrode and was placed with the surface at the positive electrode mixed material layer side thereof facing upward. A separator that had been cut out as 120 cm×5.5 cm was arranged on the positive electrode mixed material layer such that the positive electrode was positioned at a longitudinal direction left-hand side of the separator. In addition, a rectangle of 50 cm×5.2 cm was cut out from the obtained negative electrode and was arranged on the separator such that the surface at the negative electrode mixed material layer side thereof faced toward the separator and such that the negative electrode was positioned at a longitudinal direction right-hand side of the separator. The resultant stack was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: LiPF$_6$ of 1 M in concentration) was injected such that no air remained, and an opening of the aluminum packing case was closed by heat sealing at 150° C. to produce a wound lithium ion secondary battery having a capacity of 800 mAh. Good operation of the lithium ion secondary battery was confirmed.

Various measurements and evaluations were performed by the previously described methods with respect to the particulate polymers A and B, the binder composition, the slurry composition, the electrode (negative electrode), the secondary battery, and so forth obtained as described above. The results are shown in Table 1.

Examples 2 to 4 and 9

Various operations, measurements, and evaluations were performed in the same way as in Example 1 with the exception that amounts in production of the binder composition for a non-aqueous secondary battery negative electrode mixed material layer were changed such that the ratio of the particulate polymer A and the particulate polymer B was as shown in Table 1. The results are shown in Table 1.

Examples 5, 8, and 10 to 12

Various operations, measurements, and evaluations were performed in the same way as in Example 1 with the exception that mixing ratios in production of a particulate polymer A were changed such that the chemical composition of the particulate polymer A was as shown in Table 1. The results are shown in Table 1. Note that that the "Grafting step" was not performed in Example 10.

Examples 6 and 7

Various operations, measurements, and evaluations were performed in the same way as in Example 1 with the exception that mixing ratios in production of a particulate polymer B were changed such that the chemical composition of the particulate polymer B was as shown in Table 1. The results are shown in Table 1.

Examples 13 to 16

Various components shown in Table 1 were used in production of a particulate polymer B in mixing ratios such that the chemical composition of the particulate polymer B was as shown in Table 1. With the exception of the above, various operations, measurements, and evaluations were performed in the same way as in Example 1. The results are shown in Table 1.

Example 17

Various operations, measurements, and evaluations were performed in the same way as in Example 1 with the exception that 1,3-butadiene was used as an aliphatic conjugated diene monomer in production of a particulate polymer A. The results are shown in Table 1.

Example 18

In production of a particulate polymer A, a block copolymer solution was produced and then hydrogenation of the block copolymer was carried out using a Ti-based hydrogenation catalyst to obtain a hydrogenated block copolymer. The percentage hydrogenation as measured by $^1$H-NMR was 98%. The hydrogenated block copolymer that was obtained was then subjected to operations of phase-inversion emulsification, vacuum evaporation, concentration, and filtration in the same way as in Example 1 to obtain a water dispersion of a particulate polymer A. With the exception of the above, various operations, measurements, and evaluations were performed in the same way as in Example 1. The results are shown in Table 1.

Example 19

In production of a particulate polymer A, a block copolymer solution was produced using 1,3-butadiene as an aliphatic conjugated diene monomer and then hydrogenation of the block copolymer was carried out using a Ti-based hydrogenation catalyst to obtain a hydrogenated block copolymer. The percentage hydrogenation as measured by $^1$H-NMR was 98%. The hydrogenated block copolymer that was obtained was then subjected to operations of phase-inversion emulsification, vacuum evaporation, concentration, and filtration in the same way as in Example 1 to obtain a water dispersion of a particulate polymer A. With the exception of the above, various operations, measurements, and evaluations were performed in the same way as in Example 1. The results are shown in Table 1.

Comparative Example 1

Various operations, measurements, and evaluations were performed in the same way as in Example 1 with the exception that a particulate polymer B was not compounded in the binder composition. The results are shown in Table 1.

Comparative Example 2

Various operations, measurements, and evaluations were performed in the same way as in Example 1 with the exception that a particulate polymer A was not compounded in the binder composition. The results are shown in Table 1.

Comparative Example 3

Various operations, measurements, and evaluations were performed in the same way as in Example 1 with the exception that a styrene-isoprene random copolymer (SIR) produced as described below was used instead of the particulate polymer A (specific block copolymer). The results are shown in Table 1.
<Production of Styrene-Isoprene Random Copolymer (SIR)>

When starting operations for producing a particulate polymer A in the same way as in Example 1, styrene and isoprene were added at once into a pressure-resistant reactor, and a polymerization reaction was initiated.

Note that 233.3 kg of cyclohexane, 60.0 mmol of N,N,N',N'-tetramethylethylenediamine (hereinafter, referred to as TMEDA), 24.0 kg of styrene, and 76.0 kg of isoprene were added into the pressure-resistant reactor. These materials were stirred at 40° C. while 2000.0 mmol of n-butyllithium was added thereto, and 1 hour of polymerization was performed while adjusting the temperature to 50° C. to 60° C. The polymerization conversion rate was 100%.

The resultant styrene-isoprene random copolymer (SIR) was subjected to a grafting step in the same way as in Example 1 to obtain a water dispersion containing a styrene-isoprene random copolymer (SIR).

Comparative Examples 4 and 5

Various operations, measurements, and evaluations were performed in the same way as in Example 1 with the exception that mixing ratios in production of a particulate polymer B were changed such that the chemical composition of the particulate polymer B was as shown in Table 1. The results are shown in Table 1.

In Table 1, shown below:

"SIS" indicates block copolymer having styrene region-isoprene region-styrene region;

"SBS" indicates block copolymer having styrene region-butadiene region-styrene region;

"SEPS" indicates block copolymer having styrene region-ethylene region/propylene region-styrene region;

"SEBS" indicates block copolymer having styrene region-ethylene region/butadiene region-styrene region;

"SIR" indicates random copolymer that is styrene isoprene rubber;

"ST" indicates styrene unit;

"IP" indicates isoprene unit;

"Hydrogenated IP" indicates hydrogenated isoprene unit;

"BD" indicates 1,3-butadiene unit;

"Hydrogenated BD" indicates hydrogenated butadiene unit;

"MAA" indicates methacrylic acid unit;

"2EHA" indicates 2-ethylhexyl acrylate unit;

"AA" indicates acrylic acid unit;

"βHEA" indicates 2-hydroxyethyl acrylate unit;

"HEMA" indicates 2-hydroxyethyl methacrylate unit;

"AGE" indicates allyl glycidyl ether unit;

"AMA" indicates allyl methacrylate unit; and

"DVB" indicates divinylbenzene unit.

TABLE 1

| | | | | Examples | | | | | | | | | |
|---|---|---|---|---|---|---|---|---|---|---|---|---|---|
| | | | | 1 | 2 | 3 | 4 | 5 | 6 | 7 | 8 | 9 |
| Binder composition for non-aqueous secondary battery electrode | Particulate polymer A | Type | | SIS | SIS | SIS | SIS | SIS | SIS | SIS | SIS | SIS |
| | | Block structure | | Yes | Yes | Yes | Yes | Yes | Yes | Yes | Yes | Yes |
| | | Graft portion | | Yes | Yes | Yes | Yes | Yes | Yes | Yes | Yes | Yes |
| | | Aromatic vinyl monomer unit | Type | ST | ST | ST | ST | ST | ST | ST | ST | ST |
| | | | Proportion (mass %) | 23.0 | 23.0 | 23.0 | 23.0 | 11.0 | 23.0 | 23.0 | 23.0 | 23.0 |
| | | Aliphatic conjugated diene monomer unit | Type | IP | IP | IP | IP | IP | IP | IP | IP | IP |
| | | | Proportion (mass %) | 74.0 | 74.0 | 74.0 | 74.0 | 86.0 | 74.0 | 74.0 | 76.8 | 74.0 |
| | | Acidic group-containing monomer unit | Type | MAA | MAA | MAA | MAA | MAA | MAA | MAA | MAA | MAA |
| | | | Proportion (mass %) | 3.0 | 3.0 | 3.0 | 3.0 | 3.0 | 3.0 | 3.0 | 0.2 | 3.0 |
| | | Diblock content (mass %) | | 15 | 15 | 15 | 15 | 15 | 15 | 15 | 15 | 15 |
| | | Volume-average particle diameter (μm) | | 1.0 | 1.0 | 1.0 | 1.0 | 1.0 | 1.0 | 1.0 | 1.0 | 1.0 |
| | Particulate polymer B | (Meth)acrylic acid ester monomer unit | Type | 2EHA | 2EHA | 2EHA | 2EHA | 2EHA | 2EHA | 2EHA | 2EHA | 2EHA |
| | | | Proportion (mass %) | 64.1 | 64.1 | 64.1 | 64.1 | 64.1 | 80.0 | 25.0 | 64.1 | 64.1 |
| | | Aromatic vinyl monomer unit | Type | St | St | St | St | St | St | St | St | St |
| | | | Proportion (mass %) | 30.0 | 30.0 | 30.0 | 30.0 | 30.0 | 14.1 | 69.1 | 30.0 | 30.0 |
| | | Vinyl cyanide monomer unit | Type | — | — | — | — | — | — | — | — | — |
| | | | Proportion (mass %) | — | — | — | — | — | — | — | — | — |
| | | Acidic group-containing monomer unit | Type | AA | AA | AA | AA | AA | AA | AA | AA | AA |
| | | | Proportion (mass %) | 4.0 | 4.0 | 4.0 | 4.0 | 4.0 | 4.0 | 4.0 | 4.0 | 4.0 |
| | | Polar group-containing ethylenically unsaturated carboxylic acid ester monomer unit | Type | — | — | — | — | — | — | — | — | — |
| | | | Proportion (mass %) | — | — | — | — | — | — | — | — | — |
| | | Cross-linkable monomer unit | Type | AGE/AMA | AGE/AMA | AGE/AMA | AGE/AMA | AGE/AMA | AGE/AMA | AGE/AMA | AGE/AMA | AGE/AMA |
| | | | Proportion (mass %) | 1.7/0.2 | 1.7/0.2 | 1.7/0.2 | 1.7/0.2 | 1.7/0.2 | 1.7/0.2 | 1.7/0.2 | 1.7/0.2 | 1.7/0.2 |
| | | Volume-average particle diameter (μm) | | 0.15 | 0.15 | 0.15 | 0.15 | 0.15 | 0.15 | 0.15 | 0.15 | 0.15 |
| | Content ratio (polymer A:polymer B) | | | 50:50 | 65:35 | 35:65 | 25:75 | 50:50 | 50:50 | 50:50 | 50:50 | 90:10 |
| Electrode | Negative electrode mixed material layer density (g/cm$^3$) | | | 1.75 | 1.75 | 1.75 | 1.75 | 1.75 | 1.75 | 1.75 | 1.75 | 1.75 |
| Evaluation | Slurry stability | | | A | A | A | A | B | A | A | B | A |
| | Electrode swelling | | | A | A | A | A | C | B | A | B | B |
| | Injectability | | | A | A | A | A | A | A | A | B | C |
| | Low-temperature output characteristics | | | A | A | A | A | A | A | C | B | C |
| | Cycle characteristics | | | A | A | A | B | B | C | B | B | B |

| | Examples | | | | | | | | | |
|---|---|---|---|---|---|---|---|---|---|---|
| | 10 | 11 | 12 | 13 | 14 | 15 | 16 | 17 | 18 | 19 |
| Binder composition for non-aqueous secondary battery electrode | SIS | SIS | SIS | SIS | SIS | SIS | SIS | SBS | SEPS | SEBS |
| | Yes | Yes | Yes | Yes | Yes | Yes | Yes | Yes | Yes | Yes |
| | No | Yes | Yes | Yes | Yes | Yes | Yes | Yes | No | No |
| | ST | ST | ST | ST | ST | ST | ST | ST | ST | ST |
| | 22.0 | 3.0 | 75.0 | 23.0 | 23.0 | 23.0 | 23.0 | 23.0 | 23.0 | 23.0 |
| | IP | IP | IP | IP | IP | IP | IP | BD | Hydrogenated IP | Hydrogenated BD |
| | 78.0 | 94.0 | 22.0 | 74.0 | 74.0 | 74.0 | 74.0 | 74.0 | 77.0 | 77.0 |
| | — | MAA | MAA | MAA | MAA | MAA | MAA | MAA | — | — |
| | — | 3.0 | 3.0 | 3.0 | 3.0 | 3.0 | 3.0 | 3.0 | — | — |
| | 15 | 15 | 15 | 15 | 15 | 15 | 15 | 15 | 15 | 15 |
| | 1.0 | 1.0 | 1.0 | 1.0 | 1.0 | 1.0 | 1.0 | 1.0 | 1.0 | 1.0 |

TABLE 1-continued

| | | | | | | | | | |
|---|---|---|---|---|---|---|---|---|---|
| 2EHA 64.1 | 2EHA 64.1 | 2EHA 64.1 | 2EHA 75.0 | 2EHA 50.5 | 2EHA 30.0 | BA 60.0 | 2EHA 64.1 | 2EHA 64.1 | 2EHA 64.1 |
| St 30.0 | St 30.0 | St 30.0 | — | St 44.0 | St 65.0 | St 30.0 | St 30.0 | St 30.0 | St 30.0 |
| — | — | — | AN 22.0 | — | — | — | — | — | — |
| AA 4.0 | AA 4.0 | AA 4.0 | IA 2.0 | AA 3.0 | IA 2.5 | AA 9.5 | AA 4.0 | AA 4.0 | AA 4.0 |
| — | — | — | βHEA 1 | HEMA 2 | HEMA 2 | — | — | — | — |
| AGE/AMA 1.7/0.2 | AGE/AMA 1.7/0.2 | AGE/AMA 1.7/0.2 | — | DVB 0.5 | DVB 0.5 | AMA 0.5 | AGE/AMA 1.7/0.2 | AGE/AMA 1.7/0.2 | AGE/AMA 1.7/0.2 |
| 0.15 | 0.15 | 0.15 | 0.15 | 0.15 | 0.15 | 0.15 | 0.15 | 0.15 | 0.15 |
| 50:50 1.75 | 50:50 1.75 | 50:50 1.75 | 50:50 1.75 | 50:50 1.75 | 50:50 1.75 | 50:50 1.75 | 50:50 1.75 | 50:50 1.75 | 50:50 1.75 |

Electrode Evaluation:

| | | | | | | | | | |
|---|---|---|---|---|---|---|---|---|---|
| C | B | A | B | A | A | A | A | C | C |
| C | C | C | C | A | A | B | B | B | B |
| B | A | C | A | A | A | A | A | A | A |
| C | B | B | B | A | A | B | A | B | B |
| C | C | C | C | A | B | B | B | B | B |

| | Comparative examples | | | | |
|---|---|---|---|---|---|
| | 1 | 2 | 3 | 4 | 5 |
| Binder composition for non-aqueous secondary battery electrode | SIS Yes Yes ST 23.0 | — — — — | SIR No Yes ST 23.0 | SIS Yes Yes ST 23.0 | SIS Yes Yes ST 23.0 |
| | IP 74.0 | — | IP 74.0 | IP 74.0 | IP 74.0 |
| | MAA 3.0 | — | MAA 3.0 | MAA 3.0 | MAA 3.0 |
| | 15 1.0 | — | — 1.0 | 15 1.0 | 15 1.0 |
| | — | 2EHA 64.1 | 2EHA 64.1 | 2EHA 10.0 | 2EHA 90.0 |
| | — | St 30.0 | St 30.0 | St 84.1 | St 4.1 |
| | — | — | — | — | — |
| | — | AA 4.0 | AA 4.0 | AA 4.0 | AA 4.0 |
| | — | — | — | — | — |
| | — | AGE/AMA 1.7/0.2 | AGE/AMA 1.7/0.2 | AGE/AMA 1.7/0.2 | AGE/AMA 1.7/0.2 |
| | — | 0.15 | 0.15 | 0.15 | 0.15 |
| | 100:0 1.75 | 0:100 1.75 | 50:50 1.75 | 50:50 1.75 | 50:50 1.75 |
| Electrode Evaluation | A | A | A | A | A |
| | C | C | D | D | C |
| | D | A | A | A | A |
| | D | C | C | D | C |
| | C | D | D | C | D |

It can be seen from Table 1 that it was possible to improve low-temperature output characteristics and cycle characteristics of an obtained secondary battery in Examples 1 to 19 in which the used binder composition contained both a particulate polymer A that was a block copolymer including an aromatic vinyl monomer unit and an aliphatic conjugated diene monomer unit having a carbon number of 4 or more and a particulate polymer B that was a random copolymer including a (meth)acrylic acid ester monomer unit in a proportion of not less than 20 mass % and not more than 80 mass %.

On the other hand, it can be seen that it was not possible to enhance low-temperature output characteristics and cycle characteristics of an obtained secondary battery in Comparative Examples 1 and 2 in which either a particulate polymer A or a particulate polymer B such as described above was absent, Comparative Example 3 in which styrene isoprene rubber (random copolymer) was used instead of a particulate polymer A satisfying the specific conditions described above, and Comparative Examples 4 and 5 in which the proportion in which a particulate polymer B included a (meth)acrylic acid ester monomer unit was outside of the specific range set forth above.

INDUSTRIAL APPLICABILITY

According to the present disclosure, it is possible to provide a binder composition for a non-aqueous secondary battery electrode and a slurry composition for a non-aqueous secondary battery electrode with which it is possible to form an electrode for a non-aqueous secondary battery that can cause a non-aqueous secondary battery to display excellent low-temperature output characteristics and cycle characteristics.

Moreover, according to the present disclosure, it is possible to provide an electrode for a non-aqueous secondary battery that can cause a non-aqueous secondary battery to display excellent low-temperature output characteristics and cycle characteristics.

Furthermore, according to the present disclosure, it is possible to provide a non-aqueous secondary battery having excellent battery characteristics such as low-temperature output characteristics and cycle characteristics.

The invention claimed is:

1. A binder composition for a non-aqueous secondary battery electrode comprising a particulate polymer A and a particulate polymer B, wherein
the particulate polymer A is a block copolymer including an aromatic vinyl monomer unit, in a proportion of not less than 10.0 mass % and not more than 30.0 mass %, and an aliphatic conjugated diene monomer unit having a carbon number of 4 or more,
the particulate polymer A includes a graft portion, and
the particulate polymer B is a random copolymer including a (meth)acrylic acid ester monomer unit in a proportion of not less than 20.0 mass % and not more than 77.5 mass % and an aromatic vinyl monomer unit.

2. The binder composition for a non-aqueous secondary battery electrode according to claim 1, wherein the graft portion of the particulate polymer A includes an acidic group-containing monomer unit in a proportion of not less than 0.1 mass % and not more than 30.0 mass % when the particulate polymer A is taken to be 100 mass % overall.

3. The binder composition for a non-aqueous secondary battery electrode according to claim 1, wherein content of the particulate polymer A is not less than 20.0 mass % and not more than 80.0 mass % when total content of the particulate polymer A and the particulate polymer B is taken to be 100 mass %.

4. The binder composition for a non-aqueous secondary battery electrode according to claim 1, wherein the proportion of the aromatic vinyl monomer unit in the particulate polymer B is not less than 10 mass % and not more than 70 mass %.

5. The binder composition for a non-aqueous secondary battery electrode according to claim 1, wherein the particulate polymer B further includes an acidic group-containing monomer unit in a proportion of not less than 1.0 mass % and not more than 15.0 mass %.

6. A slurry composition for a non-aqueous secondary battery electrode comprising: an electrode active material; and the binder composition for a non-aqueous secondary battery electrode according to claim 1.

7. An electrode for a non-aqueous secondary battery comprising an electrode mixed material layer formed using the slurry composition for a non-aqueous secondary battery electrode according to claim 6, wherein the electrode mixed material layer has a density of 1.70 g/cm3 or more.

8. A non-aqueous secondary battery comprising the electrode for a non-aqueous secondary battery according to claim 7.

* * * * *